United States Patent
Kinderman (10) Patent No.: US 9,118,199 B2
(45) Date of Patent: Aug. 25, 2015

(54) UNIVERSAL TRY ME MODULE

(75) Inventor: Israel Richard Kinderman, Gladwyne, PA (US)

(73) Assignee: J. Kinderman & Sons, Inc., Philadelphia, PA (US)

( * ) Notice: Subject to any disclaimer, the term of this patent is extended or adjusted under 35 U.S.C. 154(b) by 498 days.

(21) Appl. No.: 13/351,839

(22) Filed: Jan. 17, 2012

(65) Prior Publication Data

US 2013/0181622 A1   Jul. 18, 2013

(51) Int. Cl.
| H05B 37/00 | (2006.01) |
| H02J 7/00 | (2006.01) |
| H05B 33/08 | (2006.01) |
| F21S 4/00 | (2006.01) |

(52) U.S. Cl.
CPC .......... *H02J 7/0063* (2013.01); *H05B 33/0806* (2013.01); *F21S 4/001* (2013.01)

(58) Field of Classification Search
CPC ........ H05B 3/0806; F21S 4/001; H02J 7/006; A63H 3/28; A63H 3/50; A63H 13/005; A63H 29/22; A63H 30/00; A63H 33/22
USPC .............. 315/193, 185 S, 172, 170, 161, 164, 315/186, 313, 317, 320, 321
See application file for complete search history.

(56) References Cited

U.S. PATENT DOCUMENTS

| 5,028,844 A * | 7/1991 | Sakaguchi et al. ............ 315/160 |
| 5,691,578 A | 11/1997 | Driska |
| 6,140,620 A | 10/2000 | Aldridge et al. |
| 6,165,037 A | 12/2000 | Van Zant |
| 7,497,588 B2 * | 3/2009 | Browder ....................... 362/192 |
| 7,762,866 B2 | 7/2010 | Hui |
| 7,994,723 B2 | 8/2011 | Budde et al. |
| 8,558,508 B2 * | 10/2013 | Fechalos et al. .............. 320/132 |
| 2002/0186151 A1 * | 12/2002 | Greenberg .................... 340/999 |
| 2003/0085625 A1 | 5/2003 | Windgassen et al. |
| 2007/0279811 A1 | 12/2007 | Wang et al. |
| 2009/0233518 A1 | 9/2009 | Hui |

* cited by examiner

*Primary Examiner* — Douglas W Owens
*Assistant Examiner* — James H Cho
(74) *Attorney, Agent, or Firm* — Panitch Schwarze Belisario & Nadel LLP (57) ABSTRACT

A universal module capable of being removably coupled to each of a plurality of distinct products for demonstrating a functionality is described. In the universal module an activation switch is operatively coupled to a DC power source. An external electrical connector is operatively coupled to the DC power source and the activation switch. An external electrical connector is configured to removably couple the universal module to an external circuit of one of the plurality of distinct products. The circuit has an integrated circuit that is operatively coupled to the DC power source, the activation switch and the external electrical connector. When the external electrical connector is coupled to the external circuit and the activation switch is activated, the integrated circuit outputs a voltage from the DC power source through the external electrical connector to enable a functionality of a coupled product for a predetermined period of time.

31 Claims, 8 Drawing Sheets

UNIVERSAL TRY ME MODULE

BACKGROUND OF THE INVENTION

In certain retail environments, it is preferable to demonstrate functionality of a product available for sale prior to the product's purchase by a user. This way, the user is able to get a better understanding of the functionalities and capabilities of the product prior to purchasing, while the product is still in a store, such as on the store shelf. Preferably, the demonstration mode of the product is available while the product is still in its packaging. Such a demonstration of a product's functionality is especially useful for products that require electrical power to operate, such as toys, holiday decorations and the like to entice the purchase thereof. In such products, the demonstration mode is enabled by the user engaging an activation switch that is accessible on or through the product packaging.

Such a demonstration mode of the product is also typically known as a "Try Me" mode and the terms "demonstration" and "Try Me" will be used interchangeably herein. The Try Me mode of the product is distinct from the product's normal operating mode. The term "normal operating mode" refers to operation of the product using the power source required for continuous operation of the product (e.g., AC power in some embodiments and DC power in other embodiments). In the Try Me mode, a subset of the product's normal functionality is demonstrated by limiting either the available functions or the amount of time the functions of the product are enabled. In order to achieve this, a product's manufacturer and/or designer typically selects a portion of the product's overall functionality that is most likely to be appealing to a potential user.

Previously, a product's Try Me mode was implemented in a number of ways. In products that operate on batteries, a selection switch could be embedded into the product, allowing switching between the product's normal and Try Me modes, both powered by the batteries of the product. In this case, a circuit configured to operate the Try Me mode is typically embedded in the product and coupled to the selection switch. The functionality that the manufacturer wishes to demonstrate to the user is programmed into an integrated circuit ("IC") in the product's operating circuit as a dedicated demonstration mode, which is enabled by the user engaging the activation switch. Generally, such a circuit is part of the product's overall operating circuit.

The selection switch is set to the Try Me mode setting prior to the product being placed into the package. Thus, the batteries that come with the product may be depleted as a result of the operation of the Try Me mode prior to the product being purchased by the user, such as by repeated trying or by the switch inadvertently being depressed during shipping and handling. After the product is purchased, the user is required to move the switch into the normal mode to enable normal operation of the product.

In other products, such as string lights that operate from an external power source, such as alternating current ("AC"), an external Try Me module may be connected to the product to enable a demonstration of the product's functionality. Previously, such external Try Me modules could only be used with products that did not have a master IC controlling the operation of the product. Typically, such an external Try Me module includes one or more batteries, an activation switch and a standard DC jack connector. The DC connector is plugged into the product's power supply jack when the product is presented in its packaging. Thus, the product's standard power supply adapter must come disconnected from the product. When the product is purchased, the purchaser unplugs the DC connector of the external Try Me module and connects a DC connector of the power supply adapter to the product to place the product in its normal operating mode.

Such external Try Me modules suffer from several deficiencies. First, such external Try Me modules could not be used to control products having a master IC controlling operation of the product. Second, products often shift during shipping, resulting in the activation switch of the Try Me module being engaged. Since the Try Me module remains activated while the activation switch is engaged, the batteries of the external Try Me module supplying power to the product are quickly depleted. When the batteries are depleted before the product is displayed in the retail setting, the functionality of the product can no longer be demonstrated to shoppers without opening the package and replacing the batteries or the entire external Try Me module. Third, the requirement to disconnect the DC connector of the Try Me module in order to connect the DC connector of the power adapter is inconvenient and confusing to many users. Fourth, such an external Try Me module may only be used with compatible products that have a DC connector jack for accepting the DC connector of the external Try Me module.

Accordingly, it is desirable to provide a Try Me module that enables a demonstration mode of a connected product for a predetermined period of time when the activation switch is engaged. It is further desirable that the Try Me module be universally compatible with a plurality of distinct products. Finally, it is desirable to provide an external Try Me module that does not require the user to disconnect the external Try Me module in order to connect a power supply adapter after purchasing the product.

BRIEF SUMMARY OF THE INVENTION

In one embodiment, a universal module capable of being removably coupled to each of a plurality of distinct products for demonstrating a functionality of the coupled product is described. The universal module includes a direct current ("DC") power source, an activation switch, an external electrical connector and a circuit. The activation switch is operatively coupled to the DC power source. The external electrical connector is operatively coupled to the DC power source and the activation switch. The external electrical connector is configured to removably couple the universal module to an external circuit of one of the plurality of distinct products. The circuit has an integrated circuit that is operatively coupled to the DC power source, the activation switch and the external electrical connector. When the external electrical connector is coupled to the external circuit and the activation switch is activated, the integrated circuit outputs a voltage from the DC power source through the external electrical connector to enable a functionality of a coupled product for a predetermined period of time.

In another embodiment, a system for demonstrating at least one actual functionality of a product is disclosed. The system includes a product, a removable module and a product package. The product has a circuit for activating the at least one actual functionality of the product when the product is supplied with electrical power. The removable module has a DC power source, a monostable circuit, an external electrical connector and an activation switch. The monostable circuit is configured to activate the at least one actual functionality of the product for a predetermined period of time when the removable module is electrically coupled to the product. The product package houses the product and the removable module. When the product and the removable module are in the product package, the activation switch is accessible to users.

In yet another embodiment, a system for demonstrating a functionality of a product to a user is disclosed. The system includes a product and a removable module. The product has a product circuit including a master IC for controlling at least one functionality of the product. The removable module has a DC power source, a monostable circuit, an external electrical connector and an activation switch. The monostable circuit is configured to activate the at least one functionality of the product when the removable module is electrically coupled to the product and the activation switch is engaged.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 5 is a circuit diagram of a product having the main control circuit of FIG. 4b and the universal Try Me module circuit of FIG. 4a;

DETAILED DESCRIPTION OF THE INVENTION

Certain terminology is used in the following description for convenience only and is not limiting. Unless specifically set forth herein, the terms "a", "an" and "the" are not limited to one element but instead should be read as meaning "at least one". The terminology includes the above-listed words, derivatives thereof and words of similar import.

The universal Try Me module of the present invention will be described herein as enabling a demonstration of an actual functionality of an exemplary holiday chasing lights set product. However, the scope of the invention is not limited to use with any particular type of product. The universal Try Me module of the present invention may be used to enable a demonstration of an actual functionality of a wide range of products, including other string lights of various sorts including those for residential, commercial or industrial use, holiday lights sets, holiday decorations, novelty items, toys, or any other product where a potential buyer may be interested in seeing the actual functionality of the product.

While the specification refers to a demonstration of the actual functionality of the product as a "demonstration mode," it is to be understood that the product itself need not have a programmed demonstration mode, as is known in the prior art. Instead, in the preferred embodiments of this invention, a Try Me module is connected to a product, lacking a built-in or preprogrammed demonstration mode, to demonstrate the product to a user by enabling at least one or a portion of at least one of the actual functionality of the product.

Figure 1:
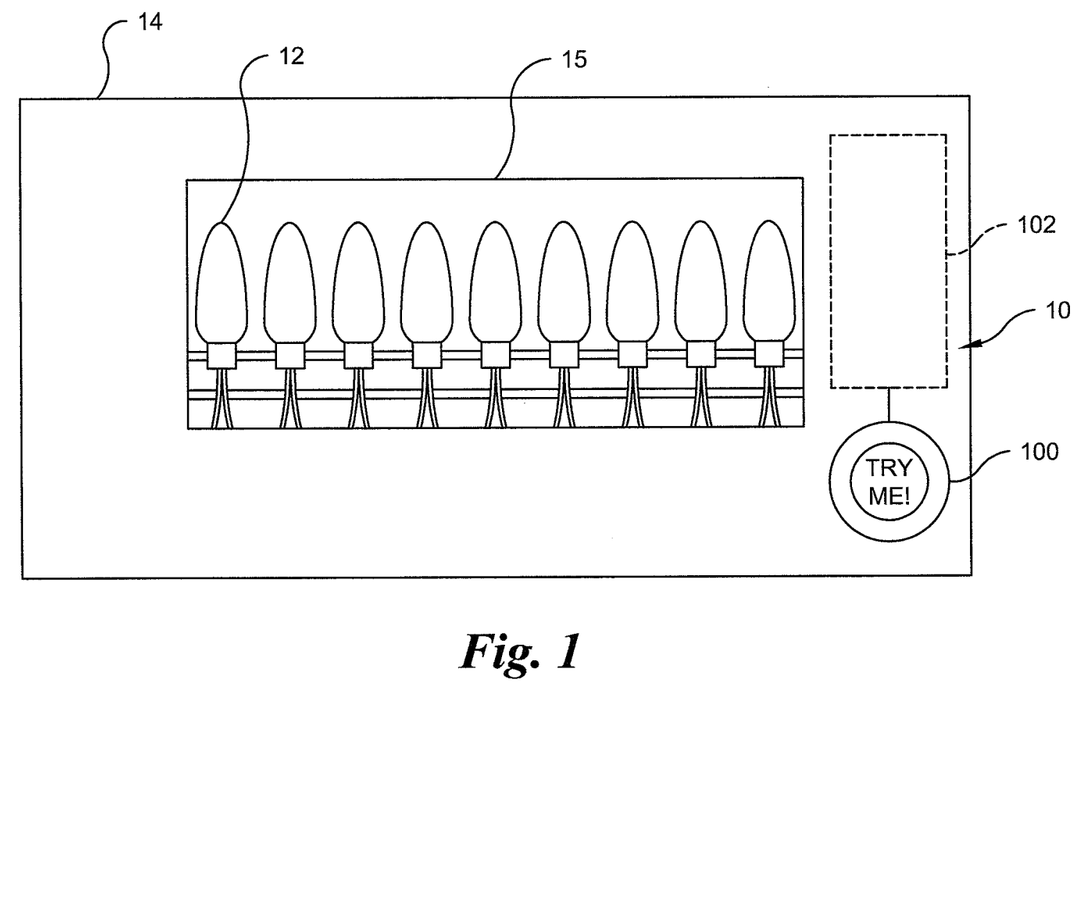
FIG. 1 is a front elevation view of a system having a product and a universal Try Me module in a product package in accordance with a preferred embodiment of this invention.

Referring to FIG. 1, a front elevation view of a system having a universal Try Me module 10 and a product 12 in a product package 14 are shown. The universal Try Me module 10 is preferably attached or otherwise secured to an inner surface of the product package 14, for example by an adhesive such as tape or glue, fasteners such as staples, rivets, screws or the like. In other embodiments, the universal Try Me module 10 or portions of the universal Try Me module 10 may be placed in the product package 14 instead of being attached thereto.

An activation switch 100 of the universal Try Me module 10 is accessible on or through the product package 14. In a preferred embodiment, the activation switch 100 is accessible on or through the front facing surface of the product package 14. The activation switch 100 may be embedded in an opening within the product package 14, such that the activation switch 100 is substantially flush with the body of the product package 14. Alternatively, the activation switch 100 may be positioned behind an opening (not shown) in the product package 14, such that a user must reach into the product package 14 through the opening in order to engage the activation switch 100. Preferably, the activation switch 100 is at or below the plane of the surface of the product package 14, where it is located so as to minimize the likelihood of inadvertently activating the activation switch 100 during shipping and handling. In other embodiments, the activation switch 100 may be positioned on any other surface or location of or within the product package 14 without departing from the scope of this invention.

Figure 2:
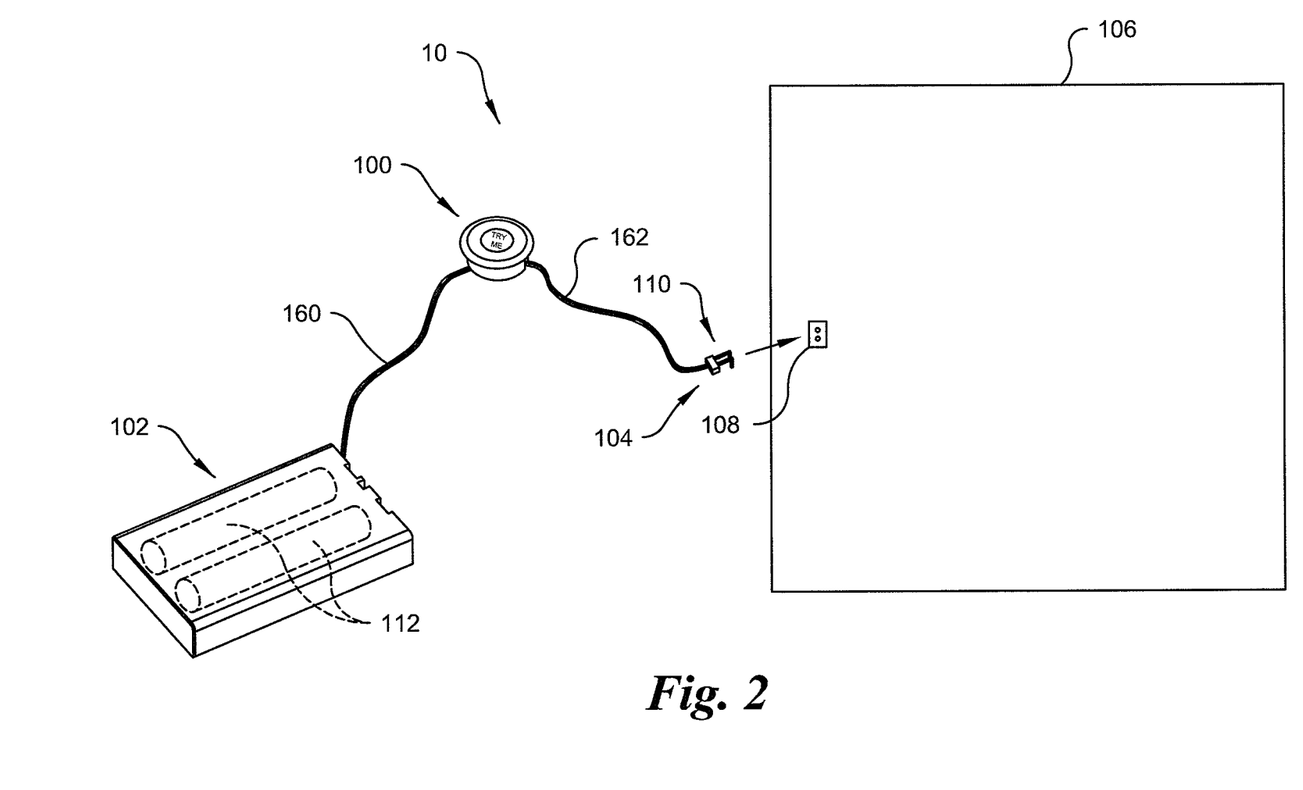
FIG. 2 is a perspective view of the components of the universal Try Me module of FIG. 1 with a housing of a component of the product.

The activation switch 100 allows a user to enable the demonstration of an actual functionality of the product 12 while the product 12 is positioned inside of the product package 14, often behind a transparent plastic window cover 15 or opening in the product package 14, without disturbing the presentation of the product 12 inside of the product package 14. While in a preferred embodiment, as shown in FIG. 2, the activation switch 100 is a push button, the activation switch 100 may also be any other type of switch, such as a rocker switch, a toggle switch, a pressure switch or the like.

Figure 4A:
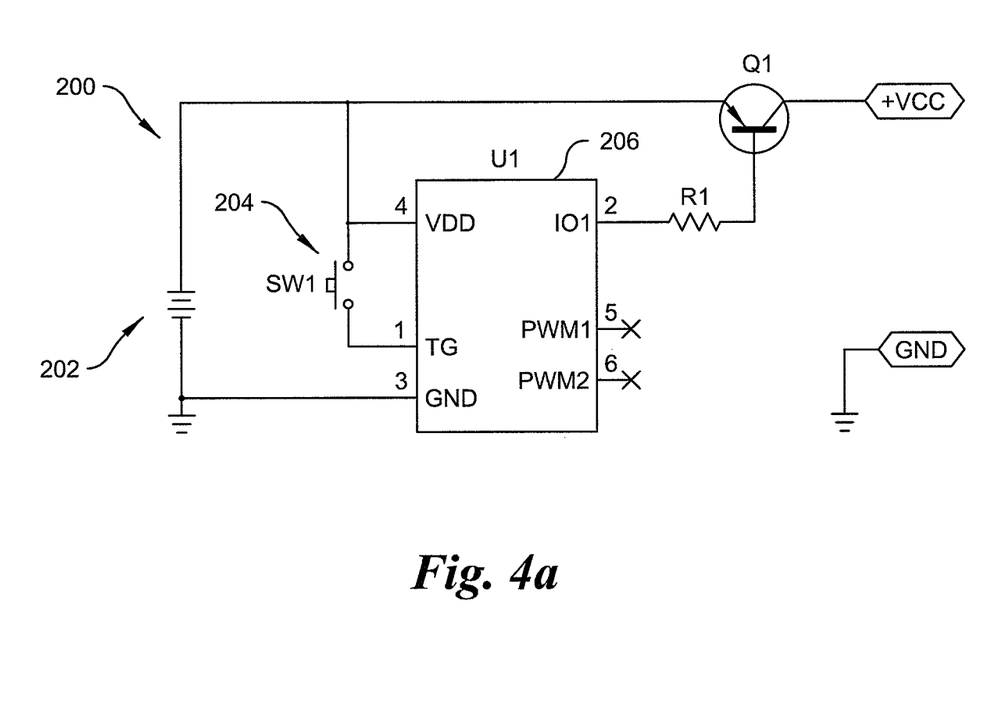
FIG. 4a is a circuit diagram of the universal Try Me module of FIG. 1.

The components of the universal Try Me module 10 will now be described with reference to FIG. 2. The universal Try Me module 10 includes a power source housing 102, the activation switch 100 and an external electrical connector 104. The power source housing 102 is configured for housing a DC power source and a circuit 200 (FIG. 4a). While the power source housing 102 is shown as being rectangular in its major plane, it may be any other shape, including square, circular, trapezoidal, or any other regular or irregular shape. In a preferred embodiment, the DC power source is a battery (or batteries) 112. The activation switch 100 is connected to the power source housing 102 by a conductor 160. However, in other embodiments, the activation switch 100 may also be integrated into the power source housing 102.

Figure 3:
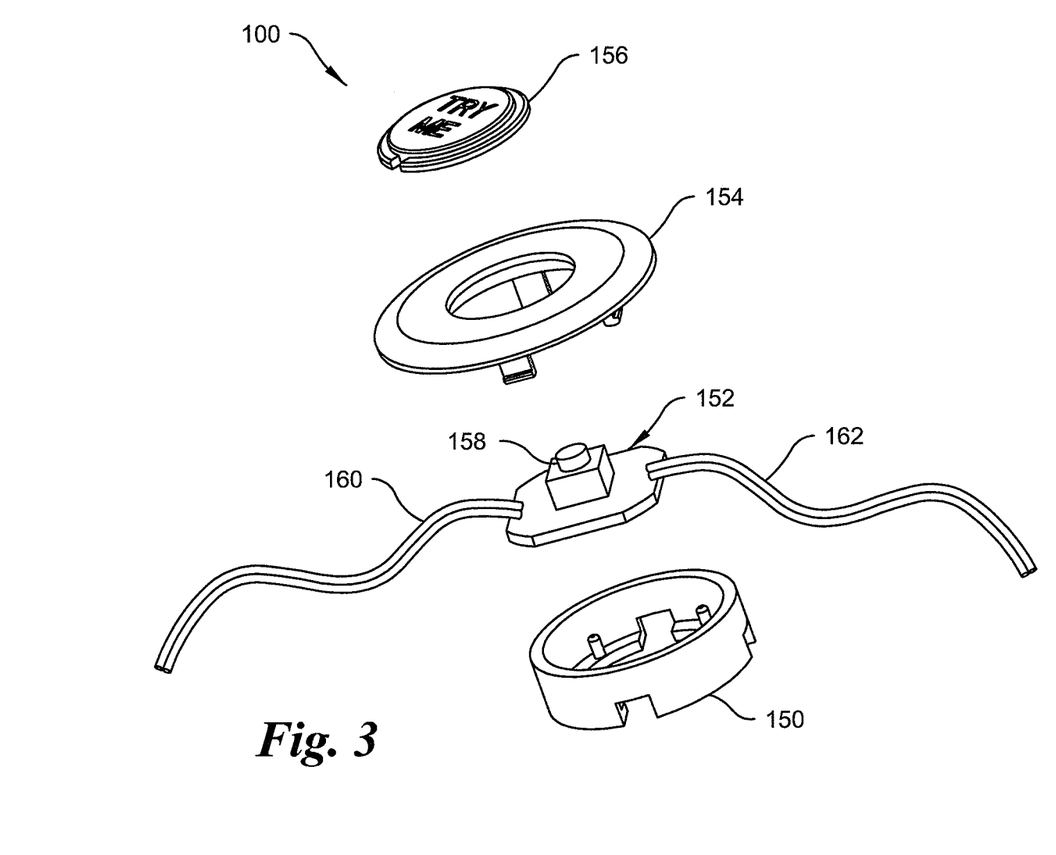
FIG. 3 is a exploded perspective view of an activation switch of the universal Try Me module of FIG. 1.

An exploded perspective view of a preferred embodiment of the activation switch 100 is shown in FIG. 3. A cylindrical activation switch housing 150 houses a printed circuit board ("PCB") 152 having a push button activation switch 158 thereon. Conductors 160 and 162 connect the printed circuit board 152 (and the push button activation switch 158) to the battery 112 in the power source housing 102. A housing cover 154, having an opening for a push button cover 156, protects the PCB 152 by closing the activation switch housing 150. The push button cover 156 provides a larger, more attractive, surface area for a user to engage the activation switch 158. Preferably, the push button cover 156 includes instructions or a message to the user. However, the instructions to the user may also be printed at other locations, including the product package 14, the activation switch housing 150 or the housing cover 154.

Referring back to FIG. 2, a second conductor 162 connects the activation switch 100 to the external electrical connector 104. The external electrical connector 104 has a plurality of pins 110 for connecting the universal Try Me module 10 to a product circuit 250 (FIG. 4b) of a product 12. The universal Try Me module 10 is removably coupled to the product 12 by plugging the plurality of pins 110 into a matching number and pattern of a plurality of electrically conductive receptacles 108 in a housing 106 of a component of the product 12. Preferably, the electrically conductive receptacles 108 are slightly undersized and resilient to provide a friction fit to hold the plurality of pins 110 therein. Thus, the possibility of the external electrical connector 104 being disconnected from the product 12 during shipment is decreased. In addition, a portion of the external electrical connector 104 may be attached to the housing 106 by a removable adhesive, such as tape, in order to maintain the connection of the plurality of pins 110 with the electrically conductive receptacles 108. In other embodiments, the electrical connector 104 and the conductive receptacles 108 may be other types and shapes of connectors without deviating from the scope of this disclosure. For example, in certain embodiments, a USB interface could be used to connect the Try Me module 10 to the product 12.

Figure 4B:
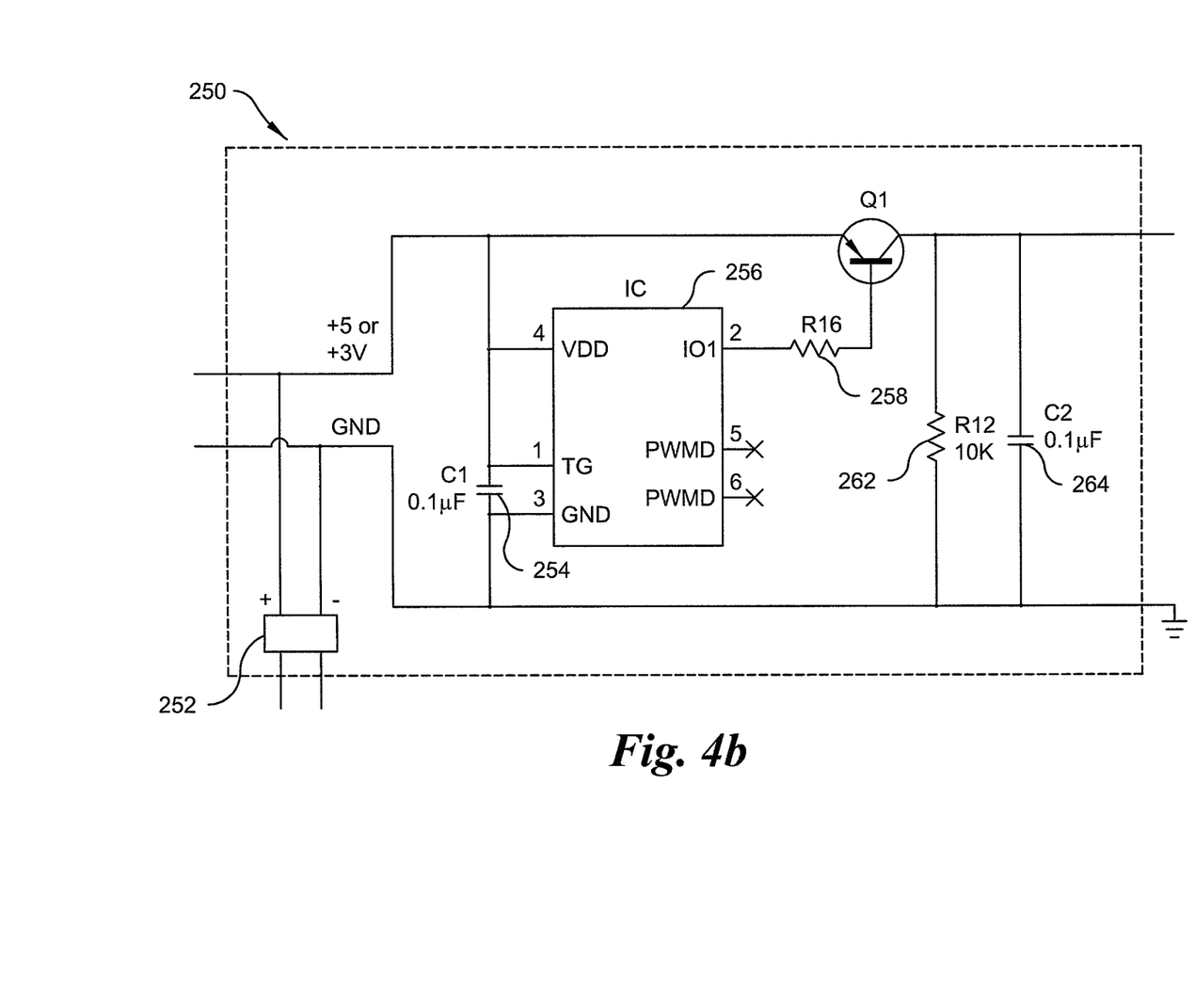
FIG. 4b is a circuit diagram of a main control circuit of a product compatible with the universal Try Me module of FIG. 1.

Referring to the circuit diagram of the product circuit 250 in FIG. 4b, the plurality of electrically conductive receptacles 108 are represented by a plurality of electrical contacts 252. The components of the product circuit 250 are contained in the housing 106. The housing 106 may be a housing of the product itself, an independent housing of a control circuit of the product, or the like. When the universal Try Me module 10 is connected to the product 12, a circuit 200 of the universal Try Me module 10 controls the functionality of the product 12 by supplying power to the product circuit 250.

FIG. 4a is a circuit diagram of an exemplary circuit 200 for controlling the functionality of the universal Try Me module 10. The Try Me circuit 200 is configured to demonstrate functionality of a connected product 12 by providing power from the Direct Current ("DC") power source 202 (e.g., the battery or batteries 112) to the output +VCC (e.g., the pins of the external electrical connector 104) when the switch 204 (e.g., the activation switch 100) is engaged. The Try Me circuit 200 is preferably implemented on one or more printed circuit boards. In a preferred embodiment, the Try Me circuit 200 is implemented on the PCB 152 of the activation switch 100. However, in other embodiments, the Try Me circuit 200 may be split, for example, between the PCB 152 and another PCB (not shown) positioned in or on the power source housing 102.

The Try Me circuit 200 includes an IC 206 having a plurality of input pins and at least one output pin. The IC 206 functions as a timer, outputting a signal to an output pin 101. In a preferred embodiment, the IC 206 is a NY3B series CMOS IC from Nyquist Technologies and the output signal at the output pin 101 is driven low when the circuit 200 is active. In other embodiments, the IC 206 may be, for example, a 555 timer IC. In the case of the 555 timer IC, an RC network is needed to determine the timing of the output pulse. That is, the selected resistor(s) and capacitor(s) making up the RC network determine the time for which the output signal will be held high. In this case, the values of the resistor(s) and capacitor(s) must be selected to satisfy the equation $T=1.1RC$, where T is a period of time in seconds, R is measured in Ohms and C is measured in Farads.

In the circuit 200, the power source 202 and a ground are connected to the VDD and GND input pins of the IC 206, respectively. The switch 204 is connected to the "TG" input pin of the IC 206. The signal output from the output pin 101 is transmitted through a resistor R1 to a PNP transistor Q1. The transistor Q1 is caused to act as a switch by selecting a resistor R1 whose value places the transistor Q1 in a saturated state, as is well known to those skilled in the art. The value of the resistor R1 is calculated using Ohm's law, based on the supply voltage of the power source 202, the maximum current required for the load (e.g., the product 12) and the minimum base current required to saturate the transistor. Thus, the transistor Q1 either outputs a current from the power source 202 to the output +VCC or prevents such a current from being outputted, depending on the whether the signal it receives at its base from the IO1 output pin of the IC 206 is high or low. While a PNP transistor is used in the Try Me circuit 200, a NPN transistor could be substituted with proper modifications to the circuit, as is well known to those skilled in the art.

In order to prevent the DC power source 202 from being depleted from accidental engaging of the activation switch 204, the Try Me circuit 200 is placed in a monostable mode. In the monostable mode, the IC 206 outputs a signal only once at the output pin IO1 when the switch 204 is engaged and then stops after a predetermined time. Therefore, in order to start a monostable circuit again, the circuit must be switched on manually a second time (e.g., by engaging the switch 204) after the predetermined amount of time has passed. Thus, the IC 206 acts as a "one-shot" pulse generator and even if pressed repeatedly during the "on" period, it will stay "on" for only that designated time period.

The monostable operation of the Try Me circuit 200 will now be described. When the activation switch 204 is engaged (e.g., by pressing the push button of the activation switch 100), the IC 206 outputs a low signal to the output pin IO1 for a predetermined period of time. While the output signal of the exemplary Try Me circuit 200 is driven low, in other embodiments the output signal may be driven high, depending on the operation and design of the circuit and the type of IC selected. In a preferred embodiment, the predetermined period of time the output pin IO1 is driven low is twenty (20) seconds. However, in other embodiments, the IC 206 may be drive the signal low at the output pin IO1 for a different amount of time. During the time that the signal is driven low to the output pin IO1, additional activations of the switch 204 are ignored. Once the predetermined period of time has passed, the signal at the output pin IO1 is driven high and the next activation of the switch 204 will restart the operation of the monostable Try Me circuit 200 by driving the output pin IO1 low again. Further, if the push button activation switch 100 is held in an engaged state, the output pin IO1 will be driven low only once, even if the activation switch 100 continues being engaged past the completion of the first activation of the Try Me circuit 200. Thus, if the activation switch 100 is accidentally held depressed, for example, during shipment, the batteries 112 of the universal Try Me module 10 will not be depleted because only a single activation of the monostable Try Me circuit 200 will result.

Figure 5:
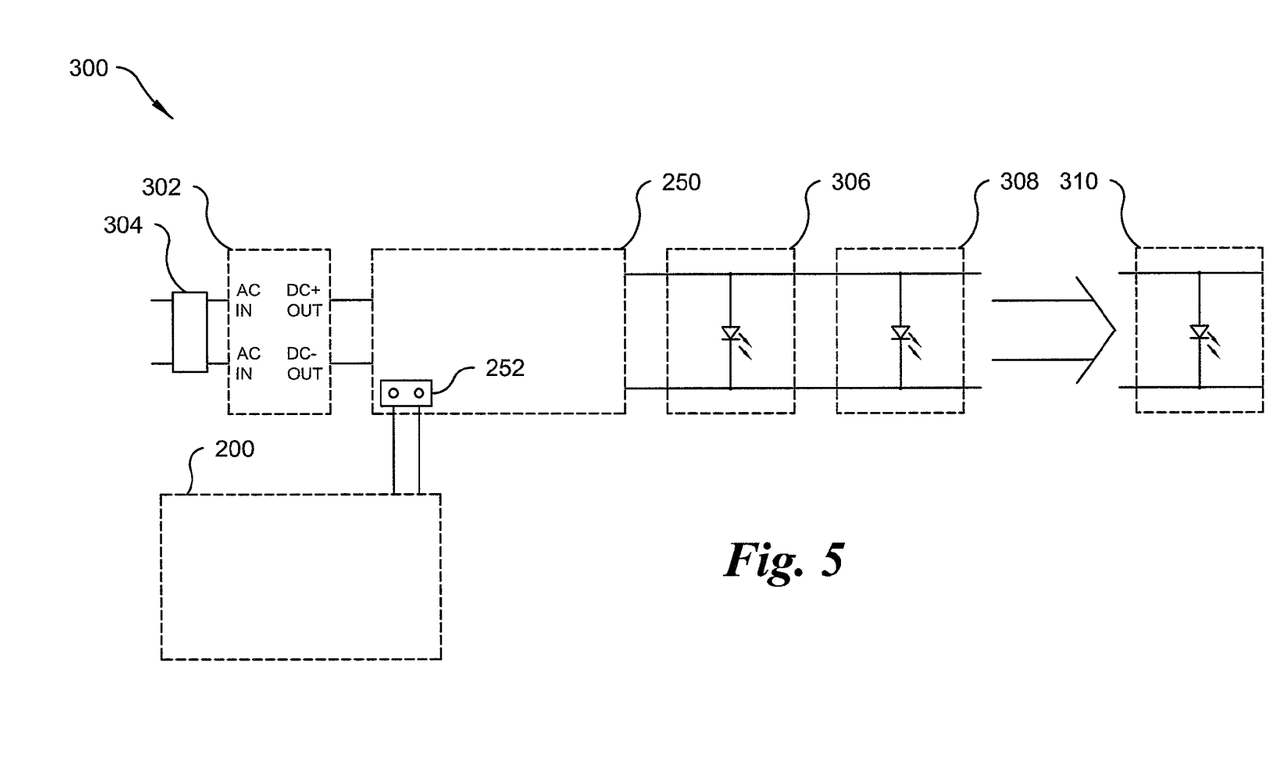

The Try Me circuit 200 of the universal Try Me module 10 is configured to be coupled to a product circuit 250. A circuit diagram of an exemplary product circuit 250 is shown in FIG. 4b. The product circuit 250 is exemplified to be configured for controlling a chasing holiday lights set, as shown in FIG. 5. A product master IC 256 controls the functionality of the product 12 to which the product circuit 250 is coupled. In the case where the product 12 is the chasing holiday lights set, the master IC 256 controls, for example, the synchronization of the individual lights of the holiday lights set to enable performance of the chasing lights pattern. Various additional circuitry, including resistors 258, 262; capacitor 264 and transistor 260 complete the product circuit 250. Further, in certain embodiments, the master IC 256 may control one or more additional ICs (not shown). For instance, referring back to the chasing holiday lights set example, each of the individual lights may have its own IC that controls the turning and turning off of that light. In this case, the master IC 256 controls and/or synchronizes the overall functionality of the chasing lights set to create the chasing lights visual effect.

Referring to FIG. 5, in a normal operation mode of the product 12, the product circuit 250 is preferably powered by a switching power supply 302 (FIG. 5). The switching power supply 302 converts an AC power source to DC power. Thus, for example, the switching power supply 302 may convert a voltage of 110 volts AC into a voltage of 3 volts DC, or the like. In the normal operating mode, AC power is preferably supplied to the switching power supply 302 by plugging a power supply plug 304 into a standard power line, such as a wall outlet receptacle (not shown), a power strip, surge protector, or the like.

When AC power is not being supplied to the switching power supply 302, the product is placed into the demonstration mode by coupling the universal Try Me module 10 to the product circuit 250. When so connected, power from the battery 112 is supplied to the product circuit 250 for the predetermined period of time when the activation switch 204 of the Try Me module circuit 200 is engaged. When power is provided to the product circuit 250, the master IC 256 is energized, thereby enabling the actual functionality of the product as it would normally be presented if a standard (e.g., AC power supply in the preferred embodiment, or DC power supply in other embodiments) power source were supplied. After purchasing the product 12, the user removes the external electrical connector 104 from the electrically conductive receptacles 108 of the product 12 and plugs the power supply plug 304 into the AC power supply, thereby placing the product 12 into its normal operating mode.

While, as illustrated in FIG. 5, the exemplary product circuit 250 has been shown for use with a holiday lights set, the product circuit 250 may be modified or adapted for a wide variety of other products requiring a demonstration of their actual functionality. In such cases, while such product circuits may be different from product circuit 250 of FIG. 4b, the product circuit 250 must include the electrical contacts 252 for coupling with the input pins 110 of the external electrical connector 104 of the universal Try Me module 10. Further, while the product circuit 250 has been shown as requiring an AC power source, the product circuit 250 may also be powered by a DC power source in its normal operation mode. In such a case, the manufacturer or assembler would not have to provide batteries for the product in order for the product's actual functionality to be demonstrated. Instead, such a product could similarly be powered by the power source of the Try Me circuit 200.

Operation of the demonstration of the product's actual functionality will now be described. As shown in FIG. 5, the Try Me circuit 200 is connected to the product circuit 250 at the electrical contacts 252. When the switch 204 of the Try Me circuit 200 is engaged, a current is output from the Try Me circuit 200 to the product circuit 250. Thus, the product circuit 250 is energized for the predetermined period of time determined in the Try Me circuit 200. During this time period, the master IC 256 in the product circuit 250 causes the lamps 306, 308, 310 of the product 12 to turn on and off, creating a chasing lights pattern. In some embodiments, each of the individual lamps 306, 308, 310 may have its own ICs (not shown) to assist with synchronizing the chasing lights pattern. When the predetermined period of time expires, the Try Me circuit 200 discontinues outputting the current to the product circuit 250, thereby ending the demonstration mode of the product 12.

Figure 6:
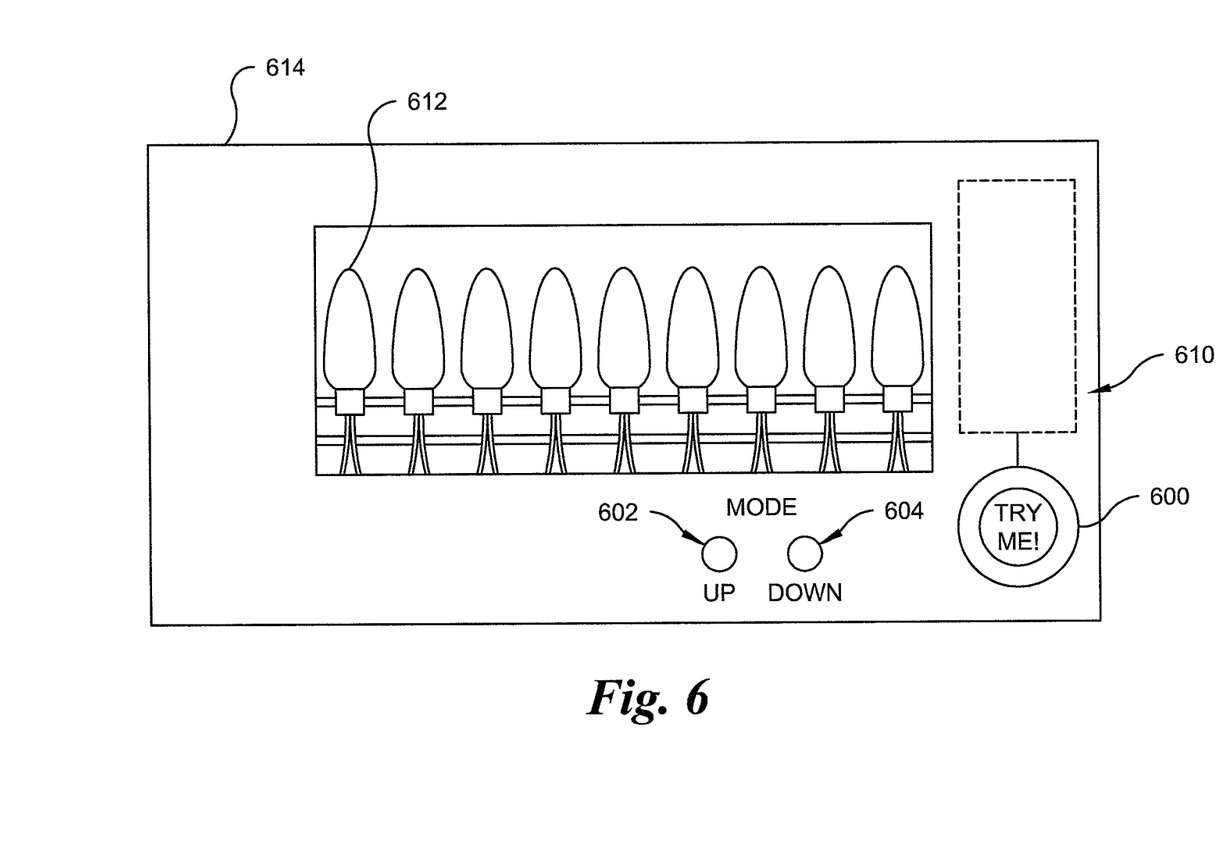
FIG. 6 is a front elevation view of a system having a product and a universal Try Me module in a product package in accordance with another embodiment of this invention.

Referring to FIG. 6, in an alternative embodiment, while the demonstration mode is activated, the user may be given an opportunity to interact with the product 612. For example, the product 612 may have multiple, selectable, modes, features, options or the like. These modes are selectable by the user interacting with one or more mode selector buttons or switches 602, 604 that are preferably accessible on or through the product packaging 614. When the Try Me module 610 is connected to the product 612 and the user activates the demonstration mode by pressing the activation switch 600, the user may interact with the product 612 by changing these modes using the accessible one or more mode selector buttons 602, 604. Once the predetermined period during which the demonstration mode is activated expires, pressing the mode selector buttons 602, 604 no longer affects the operation of the product 612. For example, the mode selector buttons 602 and 604 are used to switch between the available modes of the holiday lights set 612. The modes may change, for example, a light pattern, a speed of the light pattern, a color of the lights, or the like.

Figure 7:
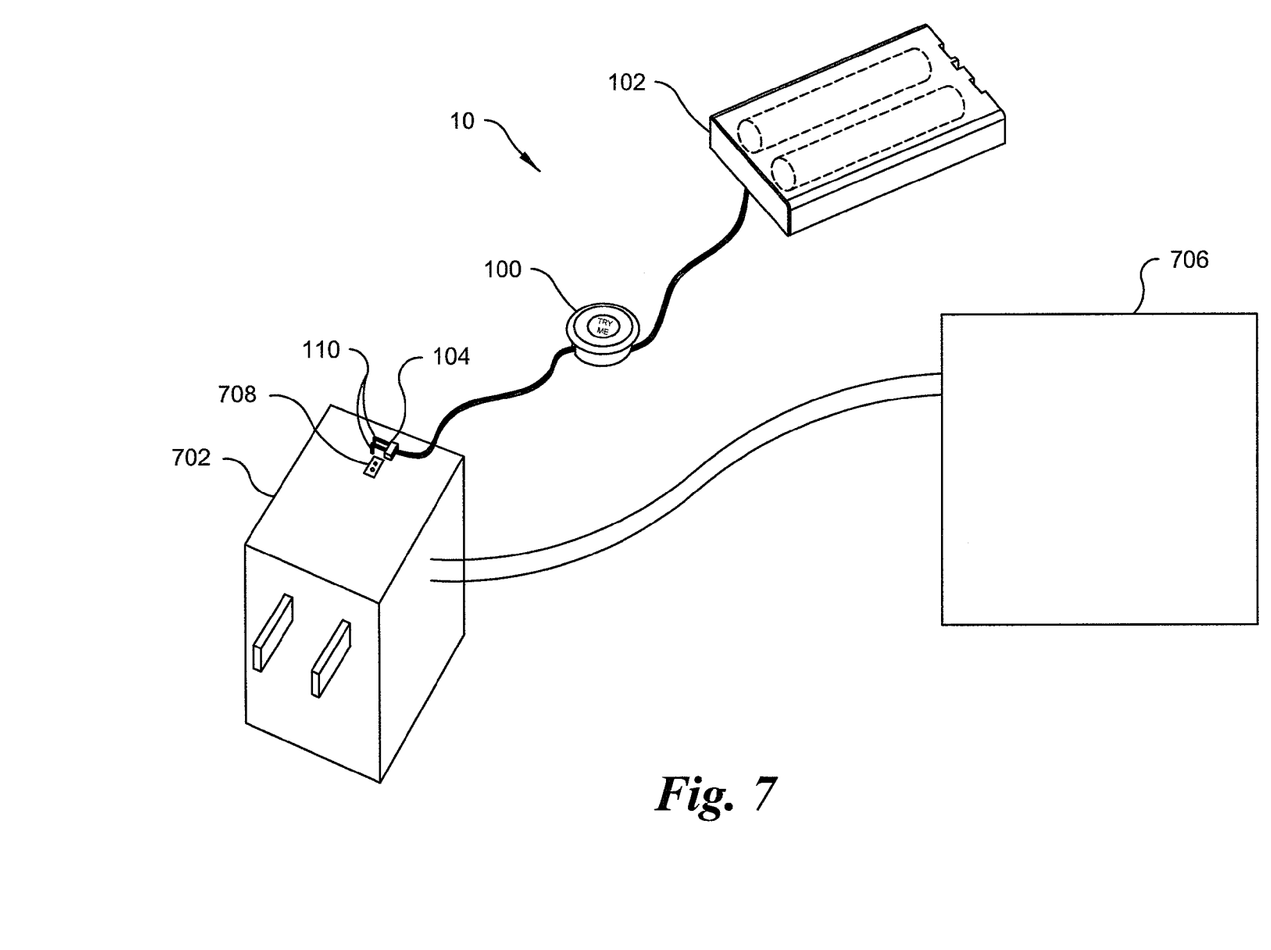
FIG. 7 is a perspective view of the components of the universal Try Me module of FIG. 1 coupled to a power supply of the product in accordance with another embodiment of this invention.

In yet another alternative embodiment, referring to FIG. 7, the electrically conductive receptacles 708 are integrated into a housing of the switching power supply 702, instead of the product circuit 250. In this case, the product circuit 250 need not have the electrical contacts 252. Instead, the external electrical connector 104 of the universal Try Me module 10 is coupled to electrically conductive receptacles 708 in a housing of the switching power supply 702. Thereafter, when the demonstration mode is activated, a DC voltage flows from the universal Try Me module 10 to the switching power supply 702 and then to a product circuit (not shown) in a housing 706.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A universal module capable of being removably coupled to each of a plurality of distinct products for demonstrating an actual functionality of any of the coupled products, wherein at least one of the distinct products has a normal operating mode powered by an alternating current ("AC") power source and at least another of the products has a normal operating mode powered by a first direct current ("DC") power source, the universal module comprising:

a DC power source;

an activation switch operatively coupled to the DC power source;

an external electrical connector operatively coupled to the DC power source and the activation switch, the external electrical connector configured to removably couple the universal module to an external circuit of one of the plurality of distinct products; and a circuit having an integrated circuit ("IC") that is operatively coupled to the DC power source, the activation switch and the external electrical connector, wherein when the external electrical connector is coupled to the external circuit and the activation switch is activated, the IC outputs a voltage from the DC power source through the external electrical connector to enable an actual functionality for a predetermined period of time in a demonstration mode of a coupled product having the normal operating mode powered by the AC power source or a coupled product having the normal operating mode powered by the first DC power source.

2. The universal module of claim 1, wherein the DC power source comprises at least one battery.

3. The universal module of claim 2, wherein the universal module is mounted in a package for the coupled product.

4. The universal module of claim 3, wherein the activation switch comprises a push button that is accessible through the package.

5. The universal module of claim 2, wherein the external electrical connector includes a plurality of electrically conductive pins and the product includes a housing having a plurality of electrically conductive receptacles, and wherein the universal module is removably coupled with the external circuit of the product by inserting the plurality of electrically conductive pins into the electrically conductive receptacles.

6. The universal module of claim 1, wherein the circuit is a monostable circuit.

7. The universal module of claim 6, wherein the IC implements a timer.

8. The universal module of claim 1, wherein the product is a set of string lights.

9. A system for demonstrating at least one actual functionality of a product, the system comprising:

a product having a circuit for activating the at least one actual functionality of the product when the product is supplied with electrical power in a normal operating mode wherein the electrical power in the normal operating mode is supplied by an AC power source or a first DC power source;

a removable module having a DC power source, a monostable circuit, an external electrical connector and an activation switch, the monostable circuit being configured to activate the at least one actual functionality of the product for a predetermined period of time in a demonstration mode when the removable module is electrically coupled to the product; and a product package housing the product and the removable module, wherein when the product and the removable module are in the product package, the activation switch is accessible to users.

10. The system of claim 9, wherein the monostable circuit includes an IC implementing a timer.

11. The system of claim 10, wherein the removable module is attached to the product package.

12. The system of claim 9, wherein the circuit of the product is housed in a housing having a plurality of electrically conductive receptacles for receiving the external electrical connector of the removable module.

13. The system of claim 12, wherein the external electrical connector of the removable module is removably coupled to the plurality of electrically conductive receptacles of the housing of the circuit when the product and the removable module are in the product package.

14. The system of claim 9, wherein the product includes a power supply housing for supplying power to the circuit of the product and wherein the power supply housing includes a plurality of electrically conductive receptacles for receiving the external electrical connector of the removable module.

15. The system of claim 14, wherein the external electrical connector of the removable module is removably coupled to the plurality of electrically conductive receptacles of the power supply housing when the product and the removable module are in the product packaging.

16. The system of claim 14, wherein the product utilizes an AC power source for operation other than when coupled with the removable module.

17. The system of claim 9, wherein the DC power source comprises one or more batteries.

18. The system of claim 17, wherein the removable module is a universal module that may be removably coupled to a plurality of distinct products in order to demonstrate the respective functionality of those products.

19. The system of claim 9, wherein the product includes at least one activation switch that may be controlled while the product is activated by the removable module.

20. The system of claim 9, wherein the product is a set of string lights.

21. A system for demonstrating a functionality of a product to a user, the system comprising:

a product having a product circuit including a master IC for controlling at least one functionality of the product when the product is supplied with electrical power in a normal operating mode wherein the electrical power in the normal operating mode is supplied by an AC power source or a first DC power source;

a removable module having a DC power source, a monostable circuit, an external electrical connector and an activation switch, the monostable circuit configured to activate the at least one functionality of the product in a demonstration mode for a first predetermined period of time when the removable module is electrically coupled to the product and the activation switch is engaged momentarily, but which does not allow the activation of the at least one functionality of the product in a demonstration mode when the activation switch is engaged more than momentarily for a second predetermined period of time or when the activation switch is engaged momentarily more frequently that during a third predetermined period of time.

22. The system of claim 21, wherein the product is powered by the AC power source.

23. The system of claim 22, wherein the product is a set of string lights.

24. The system of claim 21, wherein the external electrical connector includes a plurality of electrically conductive pins and the product includes a housing having a plurality of electrically conductive receptacles, and wherein the removable module is removably coupled with the product circuit by inserting the plurality of electrically conductive pins into the electrically conductive receptacles.

25. The system of claim 24, wherein the monostable circuit includes an IC implementing a timer.

26. The system of claim 21, wherein the product is battery powered.

27. The system of claim 21, wherein the product circuit includes one or more additional ICs, and wherein when the removable module is connected to the product circuit and the activation switch is engaged, the master IC enables operation of the one or more additional ICs.

28. A system for demonstrating at least one actual functionality of a product, the system comprising:
- a product having a circuit for activating the at least one actual functionality of the product when the product is supplied with electrical power;
- a removable module having a DC power source, a monostable circuit, an external electrical connector and an activation switch, the monostable circuit configured to activate the at least one actual functionality of the product for a predetermined period of time when the removable module is electrically coupled to the product; and
- a product package housing the product and the removable module, wherein when the product and the removable module are in the product package, the activation switch is accessible to users, wherein the product includes a power supply housing for supplying power to the circuit of the product and wherein the power supply housing includes a plurality of electrically conductive receptacles for receiving the external electrical connector of the removable module.

29. The system of claim 28, wherein the external electrical connector of the removable module is removably coupled to the plurality of electrically conductive receptacles of the power supply housing when the product and the removable module are in the product packaging.

30. The system of claim 28, wherein the product utilizes an AC power source for operation other than when coupled with the removable module.

31. A system for demonstrating a functionality of a product to a user, the system comprising:
- a product having a product circuit including a master IC for controlling at least one functionality of the product;
- a removable module having a DC power source, a monostable circuit, an external electrical connector and an activation switch, the monostable circuit configured to activate the at least one functionality of the product when the removable module is electrically coupled to the product and the activation switch is engaged, wherein the product circuit includes one or more additional ICs, and wherein when the removable module is connected to the product circuit and the activation switch is engaged, the master IC enables operation of the one or more additional ICs.

\* \* \* \* \*